(12) United States Patent
    Qi

(10) Patent No.: US 11,613,084 B2
(45) Date of Patent: Mar. 28, 2023

(54) WELDER FOR LAMINATES WITH DISSIMILAR WELDING SURFACES

(71) Applicant: Owens Corning Intellectual Capital, LLC, Toledo, OH (US)

(72) Inventor: Weigang Qi, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/531,937

(22) Filed: Nov. 22, 2021

(65) Prior Publication Data

US 2022/0080677 A1 Mar. 17, 2022

Related U.S. Application Data

(63) Continuation of application No. 16/893,352, filed on Jun. 4, 2020, now Pat. No. 11,207,843.

(60) Provisional application No. 62/950,979, filed on Dec. 20, 2019.

(51) Int. Cl.
    *B29C 65/18* (2006.01)
    *B29C 65/78* (2006.01)
    *B29C 65/00* (2006.01)
    *E02D 31/00* (2006.01)

(52) U.S. Cl.
    CPC .......... *B29C 65/18* (2013.01); *B29C 65/7894* (2013.01); *B29C 66/1122* (2013.01); *B29C 66/43* (2013.01); *B29C 66/723* (2013.01); *B29C 66/865* (2013.01); *E02D 31/004* (2013.01); *Y10T 156/1715* (2015.01)

(58) Field of Classification Search
    CPC ................. B29C 66/1122; B29C 66/43; B29C 66/865–86535; E02D 31/004
    See application file for complete search history.

(56) References Cited

U.S. PATENT DOCUMENTS

| 2,387,566 | A  | 10/1945 | Custers |
| 4,050,972 | A  | 9/1977  | Cardinal, Jr. |
| 4,894,112 | A  | 1/1990  | Lippman |
| 4,960,478 | A  | 10/1990 | Newkirk et al. |
| 5,160,221 | A  | 11/1992 | Rohe et al. |
| 5,507,900 | A  | 4/1996  | Mohammed et al. |
| 5,728,424 | A  | 3/1998  | Walling |
| 6,213,184 | B1 | 4/2001  | Sinclair |
| 6,390,168 | B1 | 5/2002  | Struve |
| 8,230,892 | B1 | 7/2012  | George et al. |
| 2007/0218286 | A1 | 9/2007 | Bamforth |
| 2010/0055443 | A1 | 3/2010 | Halahmi et al. |
| 2014/0227044 | A1 | 8/2014 | Youngblood, Jr. et al. |

(Continued)

FOREIGN PATENT DOCUMENTS

| WO | 2008150257 A1 | 12/2008 |
| WO | 2013156132 A1 | 10/2013 |
| WO | 2018126309 A1 | 7/2018 |

OTHER PUBLICATIONS

Office Action from U.S. Appl. No. 16/893,352 dated Jun. 14, 2021.

(Continued)

*Primary Examiner* — Carson Gross
(74) *Attorney, Agent, or Firm* — Calfee, Halter & Griswold LLP

(57) ABSTRACT

A welder for joining two polymeric sheets together using a wedged heating element allows for a heating profile on opposite faces of the heating element to be varied by controlling where each of the polymeric sheets contacts the corresponding face.

17 Claims, 15 Drawing Sheets

(56) References Cited

U.S. PATENT DOCUMENTS

2015/0239173 A1  8/2015  Gisler et al.
2018/0319095 A1  11/2018  Sigrist et al.

OTHER PUBLICATIONS

Notice of Allowance from U.S. Appl. No. 16/893,352 dated Sep. 9, 2021.

WELDER FOR LAMINATES WITH DISSIMILAR WELDING SURFACES

RELATED APPLICATIONS

This application is a continuation of U.S. application Ser. No. 16/893,352, filed on Jun. 4, 2020, which claims priority to and all benefit of U.S. Provisional Application No. 62/950,979, filed on Dec. 20, 2019, the entire disclosures of which are fully incorporated herein by reference.

FIELD

The general inventive concepts relate to geomembranes, to an improved device for welding discrete pieces of the geomembrane material together, and to a method of joining a first polymeric sheet and a second polymeric sheet together by thermal bonding.

BACKGROUND

As known in the art, geomembranes are low permeability synthetic membrane liners or barriers that are used to control fluid migration. Typical uses for geomembranes include heavy-duty covers and temporary liners for various applications in oil fields, landfills, water containments, remediation, agriculture, etc. Geomembranes are often made from relatively thin continuous polymeric sheets.

A conventional geomembrane 100 is shown in FIGS. 1A-1B. The geomembrane 100 includes a first side 102, a second side 104, a third side 106, and a fourth side 108. The distance between the first side 102 and the second side 104 defines the length l of the geomembrane 100. The distance between the third side 106 and the fourth side 108 defines the width w of the geomembrane 100. Typically, during production the width w of the geomembrane 100 is constrained by processing and packaging concerns, while the length l of the geomembrane 100 can be as long as desired. Consequently, the width w is often considerably less than the length l. Often, the geomembrane 100, once produced, is stored on a roll.

The geomembrane 100 also includes a fifth side 110 and a sixth side 112. The fifth side 110 defines an upper surface $S_u$ and the sixth side 112 defines a lower surface $S_l$ of the geomembrane 100. The distance between the fifth side 110 and the sixth side 112 defines the thickness t of the geomembrane 100.

Geomembranes typically include multiple distinct polymeric layers. The layers are joined to one another (e.g., coated together, adhered together) to form the geomembrane. For example, the geomembrane 100 includes four distinct layers including a first layer 120, a second layer 122, a third layer 124, and a fourth layer 126. The first layer 120 defines the upper surface $S_u$ of the geomembrane 100, while the fourth layer 126 defines the lower surface Si of the geomembrane 100. In the geomembrane 100, while the second layer 122 and the third layer 124 are different from the first layer 120, the fourth layer 126 is the same as the first layer 120.

As noted above, because the width w of the geomembrane 100 is rarely wide enough for a particular application, a first instance 130 of the geomembrane 100 is positioned next to a second instance 140 of the geomembrane 100, such that a portion of the geomembranes 130, 140 overlap with one another to form an overlapped region 150. The first geomembrane 130 has a first width $w_1$ and the second geomembrane 140 has a second width $w_2$, wherein $w_1$ typically equals $w_2$. The overlapped region 150 has a third width $w_3$ and defines an area where the geomembranes 130, 140 are joined together, such as by thermal bonding (i.e., welding). The joined geomembranes 130, 140 form a geomembrane 200 having a fourth width $w_4$ ($w_1+w_2$)−$w_3$). The process can be repeated with additional lengths of geomembranes to achieve a desired overall width.

FIGS. 3A-3C illustrate a wedge welder 300 for welding two overlapped sheets of geomembrane material, such as the geomembranes 130, 140 shown in FIG. 2. The wedge welder 300 is typically a hand-held device that is positioned to traverse an overlapped region (e.g., the overlapped region 150) in a direction indicated by arrow 380.

The wedge welder 300 includes a body 302, a wedge 304, a guide plate 306, and a pressure mechanism (here, a pair of rollers 308). The body 302 holds the other components together and can include additional structure, such as a handle (not shown).

The wedge 304 includes a heating element 310, as shown in FIG. 3C, that relatively evenly heats an upper surface 312 of the wedge 304 and a lower surface 314 of the wedge 304. In this manner, the upper surface 312 of the wedge 304 defines a first heating path 320 between points 322 and 324, while the lower surface 314 of the wedge 304 defines a second heating path 326 between points 328 and 330.

The guide plate 306 includes a body 340 that extends between a first end 342 and a second end 344. The body 304 is often made of metal (e.g., stainless steel). The first end 342 of the body 340 is separated from the wedge 304 by a fixed distance that forms a gap g.

As shown in FIG. 3B, the guide plate 306 guides the overlapped sheets so that an upper sheet of the geomembrane material (i.e., the geomembrane 130) is conveyed to the upper surface 312 of the wedge 304 and a lower sheet of the geomembrane material (i.e., the geomembrane 140) is conveyed to the lower surface 314 of the wedge. After the geomembrane 130 traverses the first heating path 320 and the geomembrane 140 traverses the second heating path 326, the rollers 308 immediately press the heated materials together to form a weld 350 (i.e., a seam of the geomembrane 200).

For purposes of illustration, the first heating path 320 and the second heating path 326 are represented as linear distances in the diagram 400 of FIG. 4. The first heating path 320 has a length $l_1$ and the second heating path 326 has a length $l_2$. Thus, since the length $l_1$ is equal to the length $l_2$ and since the temperature applied along the first heating path 320 is substantially equal to the temperature applied along the second heating path 326, the lower surface $S_l$ of the geomembrane 130 and the upper surface $S_u$ of the geomembrane 140 forming the seam 350 receive substantially the same amount of heat applied by the wedge 304. While this even application of heat may suffice when the material of the lower surface $S_l$ of the geomembrane 130 and the material of the upper surface $S_u$ of the geomembrane 140 are the same material, it presents drawbacks when the surfaces being welded are formed of different materials.

In view of the above, there is an unmet need for an improved wedge welder for thermally bonding geomembranes when the surfaces being welded are dissimilar.

SUMMARY

The general inventive concepts relate to a welder for joining two geomembranes together, wherein the surfaces of the geomembranes being welded together are dissimilar. Additionally, the general inventive concepts encompass an improved wedge welder, wherein the heating profile on one side of the wedge can be varied relative to the heating profile on the other side of the wedge, notwithstanding that a single/common heating element is used.

In one exemplary embodiment, a welder for joining a first polymeric sheet and a second polymeric sheet together by thermal bonding is disclosed. The welder comprises: a heating element having a first face defining a first heating length and a second face defining a second heating length; and a guide plate for conveying the first polymeric sheet to the first face and the second polymeric sheet to the second face, wherein the first heating length is equal to the second heating length, and wherein a portion of the guide plate covers a portion of the first face.

In some exemplary embodiments, the first polymeric sheet has a lower surface formed of a first material, the second polymeric sheet has an upper surface formed of a second material, and the first material and the second material are different.

In some exemplary embodiments, the first polymeric sheet and the second polymeric sheet have the same construction.

In some exemplary embodiments, the first polymeric sheet and the second polymeric sheet are geomembranes.

In some exemplary embodiments, the first polymeric sheet comprises a plurality of layers, and the second polymeric sheet comprises a plurality of layers.

In some exemplary embodiments, the first polymeric sheet comprises four layers, and the second polymeric sheet comprises four layers.

In some exemplary embodiments, the heating element is a wedge-shaped member, such that a distance between the first face of the heating element and the second face of the heating element varies over a length of the heating element.

In some exemplary embodiments, the welder is portable and includes a handle for carrying the welder.

In some exemplary embodiments, the heating element heats the upper face and the lower face to a welding temperature, wherein the welding temperature is in the range of 315° C. to 460° C.

In some exemplary embodiments, the heating element heats the upper face and the lower face to a welding temperature, wherein the welding temperature is in the range of 350° C. to 400° C.

In some exemplary embodiments, the guide plate is metal.

In some exemplary embodiments, the guide plate is stainless steel.

In some exemplary embodiments, a width of the guide plate is in the range of 3.0 inches to 3.5 inches.

In some exemplary embodiments, a length of the guide plate is in the range of 5.0 inches to 6.0 inches.

In some exemplary embodiments, a length of the guide plate is in the range of 6.5 inches to 7.5 inches.

In some exemplary embodiments, a thickness of the guide plate is in the range of 0.5 inches to 0.7 inches.

In some exemplary embodiments, the guide plate is fixed relative to the heating element.

In some exemplary embodiments, the guide plate is adjustable relative to the heating element.

In some exemplary embodiments, the guide plate is manually adjustable relative to the heating element.

In some exemplary embodiments, the guide plate is motorized for automatic adjustment.

In some exemplary embodiments, the portion of the guide plate covers between 5% to 95% of the first face of the heating element.

In some exemplary embodiments, the portion of the guide plate covers between 15% to 85% of the first face of the heating element.

In some exemplary embodiments, the portion of the guide plate covers between 25% to 75% of the first face of the heating element.

In some exemplary embodiments, the portion of the guide plate covers between 35% to 65% of the first face of the heating element.

In some exemplary embodiments, the portion of the guide plate covers between 45% to 55% of the first face of the heating element.

In some exemplary embodiments, the portion of the guide plate covers at least one third of the first face of the heating element.

In some exemplary embodiments, the portion of the guide plate covers at least one half of the first face of the heating element.

In some exemplary embodiments, the portion of the guide plate covers half of the first face of the heating element.

In one exemplary embodiment, a method of joining a first polymeric sheet and a second polymeric sheet together by thermal bonding is disclosed. The method comprises: providing a wedge-shaped heating element having a first face defining a first heating length extending from a first point to a second point and a second face defining a second heating length extending from a third point to a fourth point; conveying the first polymeric sheet to the first face of the heating element so that the first polymeric sheet travels less than the first heating length; and conveying the second polymeric sheet to the second face of the heating element so that the second polymeric sheet travels the second heating length.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

The general inventive concepts relate to a welder for joining two geomembranes together, wherein the surfaces of the geomembranes being welded together are dissimilar. In some exemplary embodiments, the welder is a wedge welder, wherein the heating profile on one side of the wedge can be varied relative to the heating profile on the other side of the wedge, notwithstanding that a single/common heating element is used.

Figure 1A:
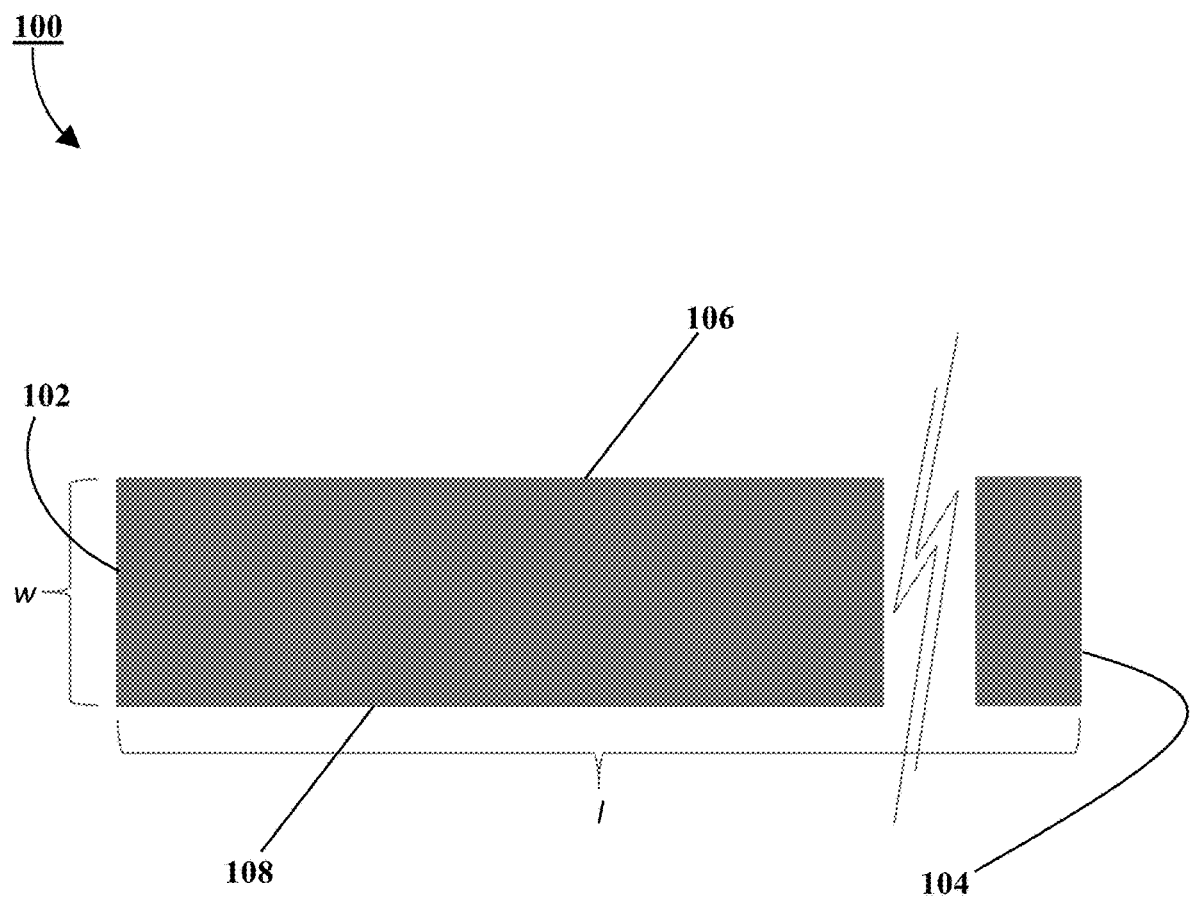
FIGS. 1A-1B are diagrams illustrating a conventional multi-layer geomembrane, wherein the upper layer and the lower layer are the same.
Figure 1B:
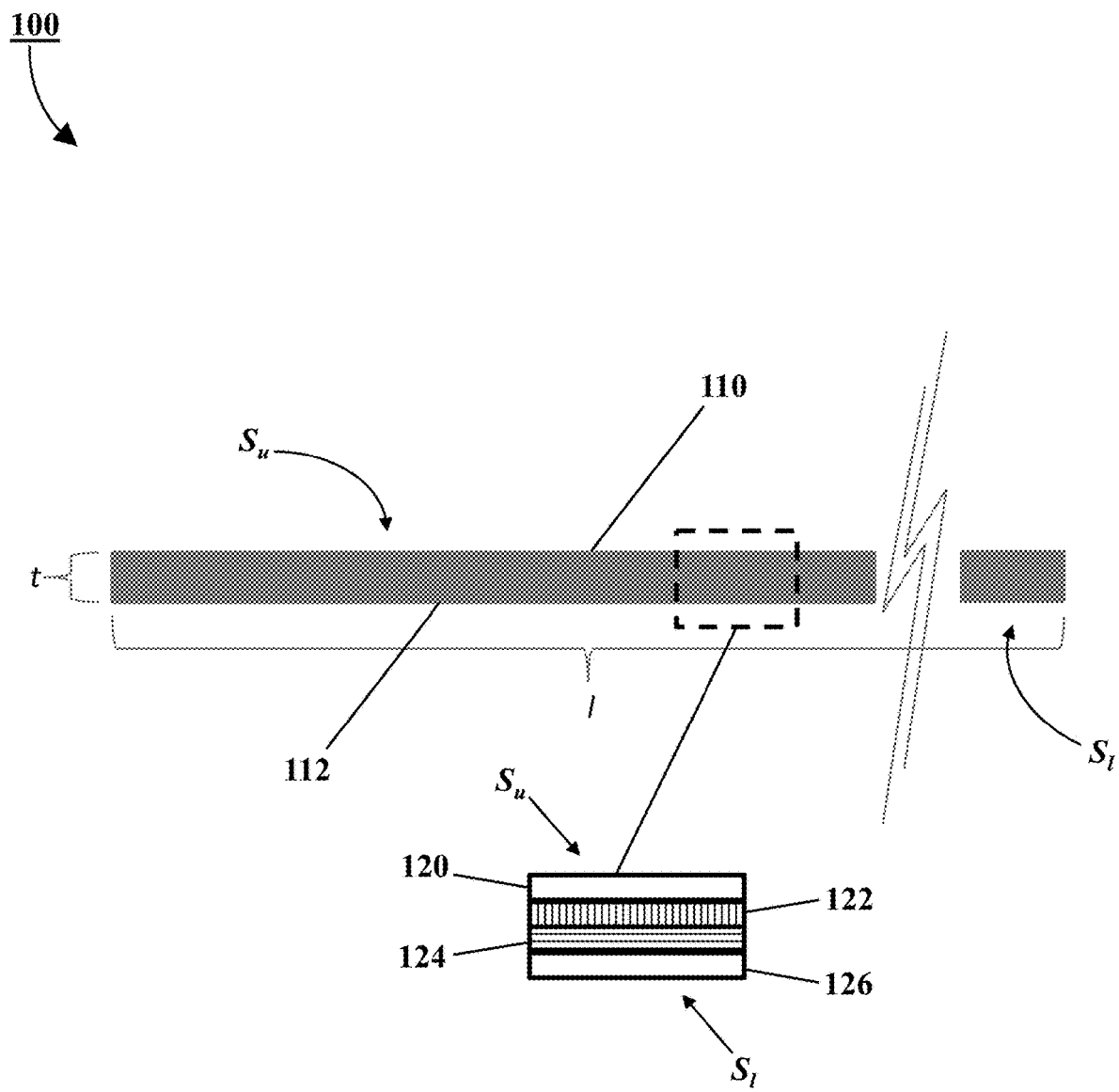
Figure 2:
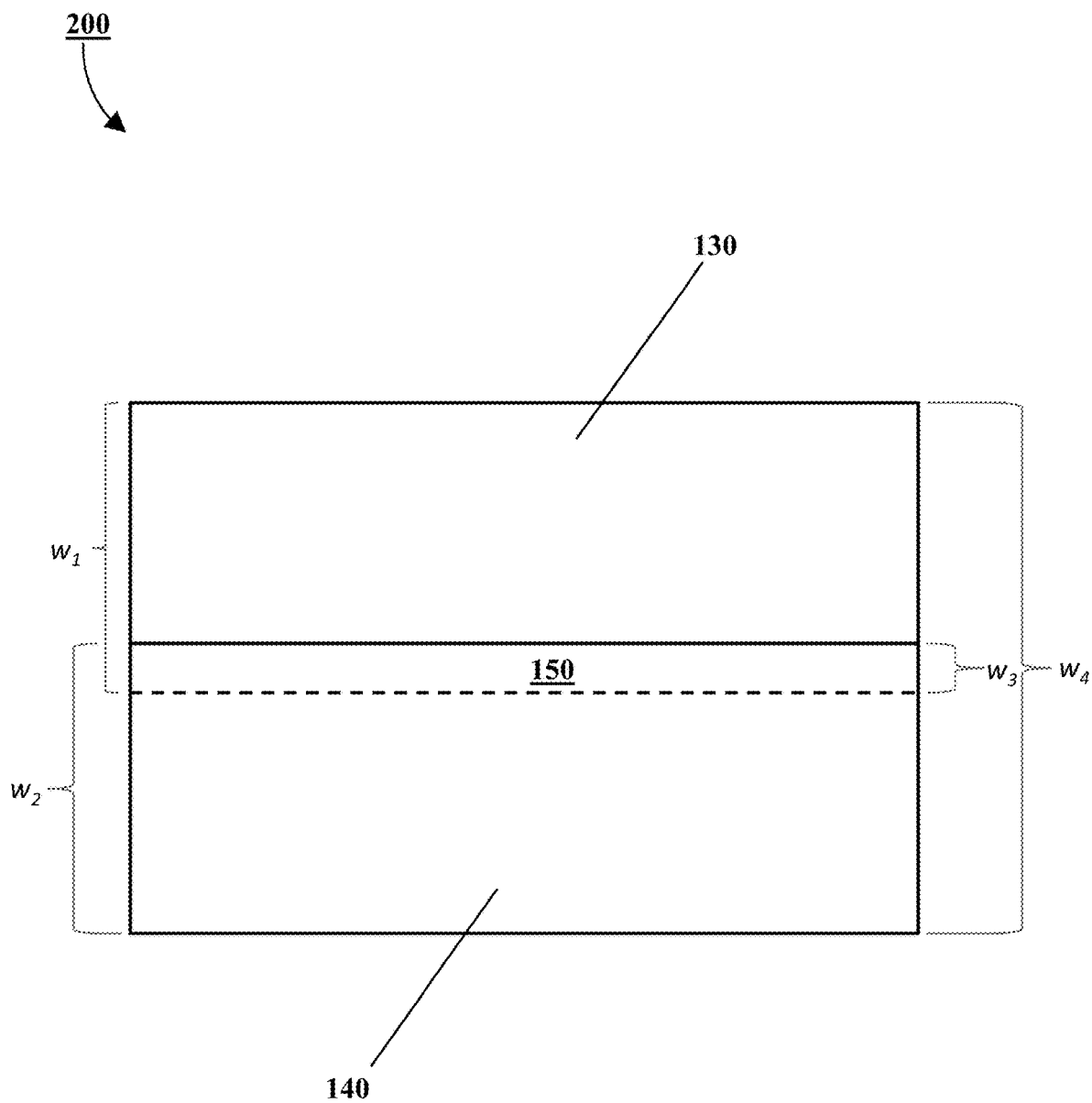
FIG. 2 is a diagram illustrating two pieces of the geomembrane of FIGS. 1A-1B positioned relative to one another in advance of welding the pieces together.
Figure 3A:
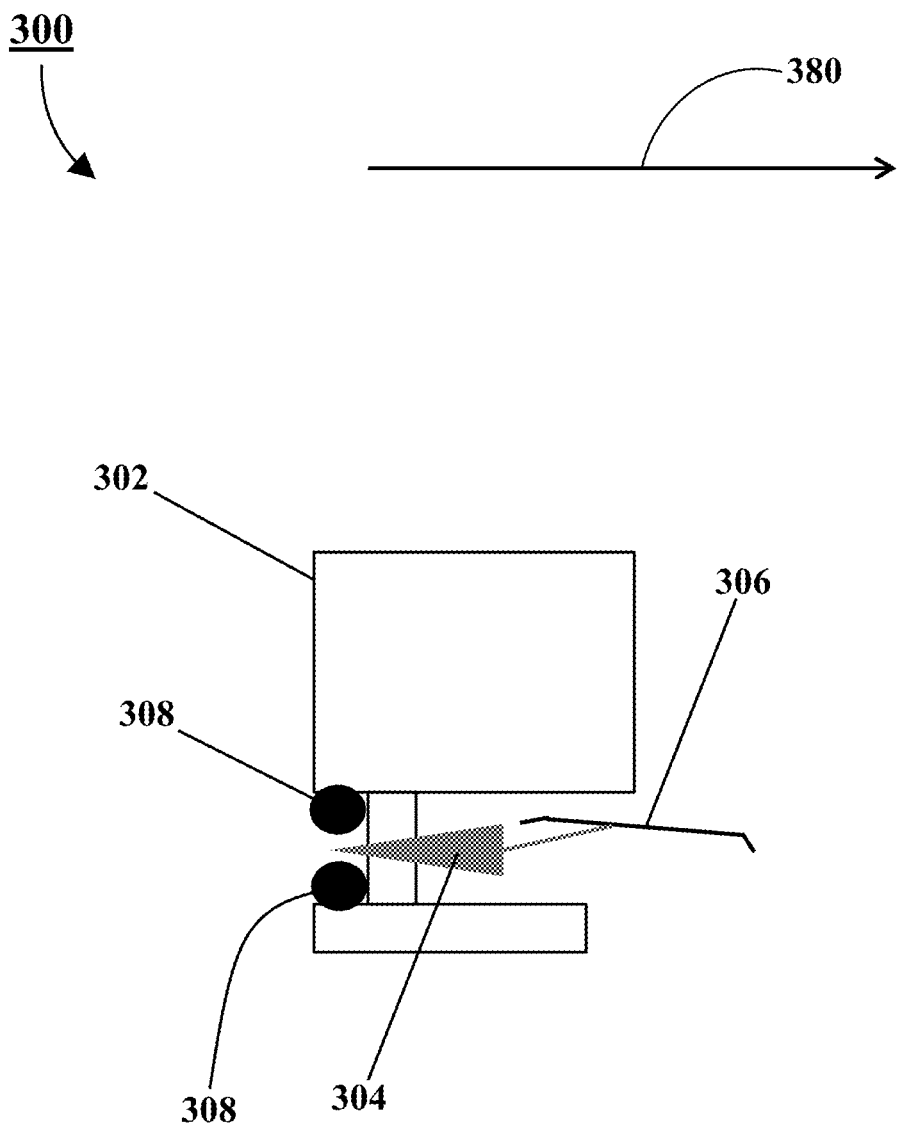
FIGS. 3A-3C are diagrams illustrating (a side view of) a conventional welding device for welding the geomembrane pieces of FIG. 2 together.
Figure 3B:
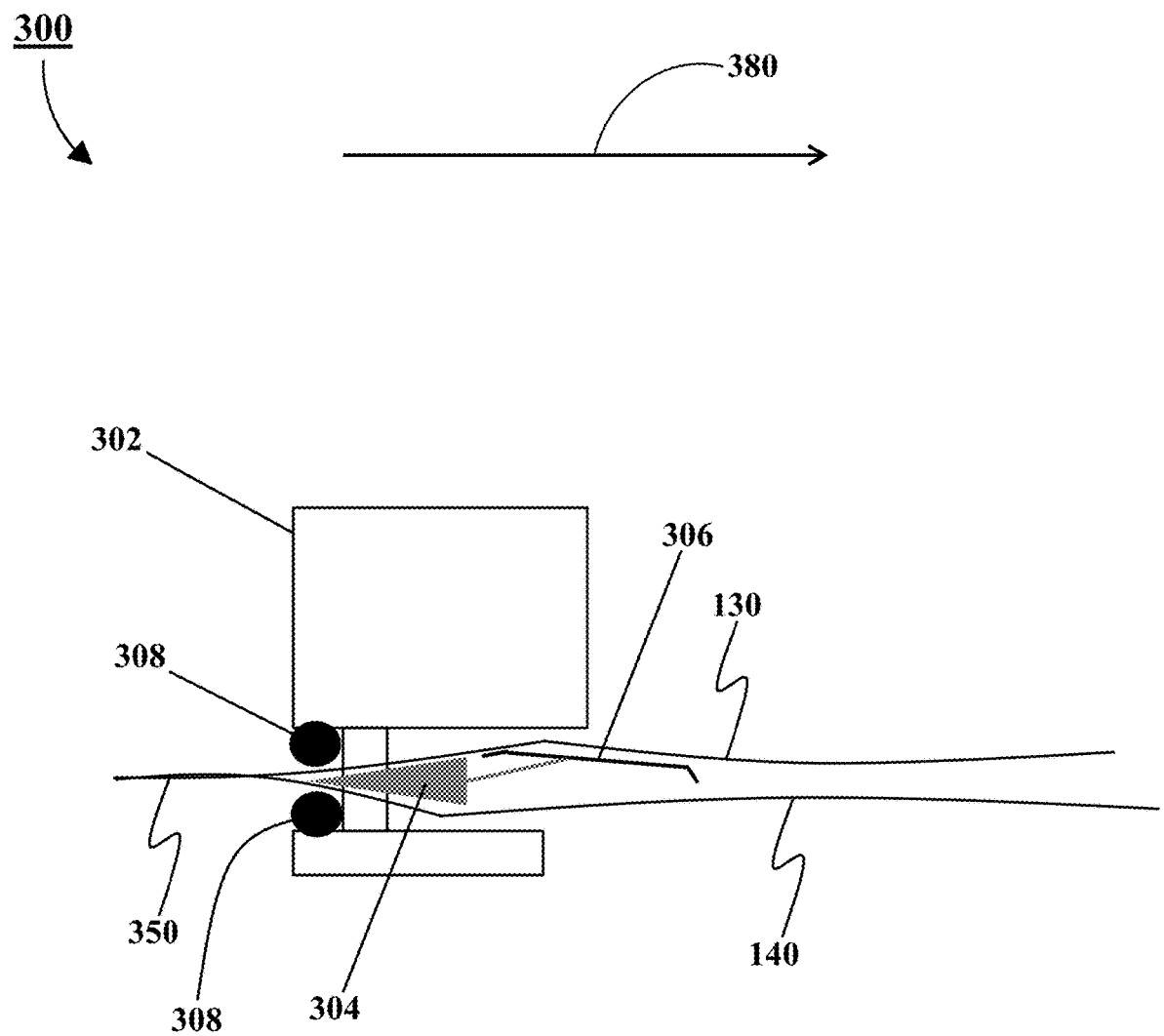
Figure 3C:
Figure 3C:
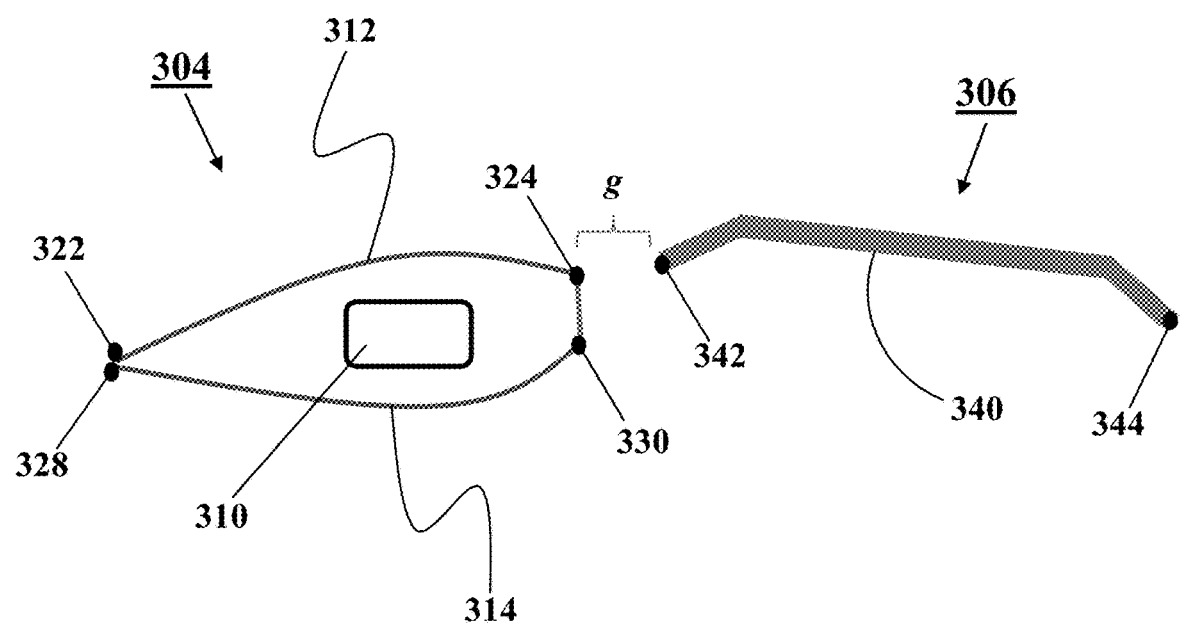
Figure 4:
FIG. 4 is a diagram illustrating the heating paths that each of the geomembrane pieces of FIG. 2 travels during the welding process.
Figure 4:
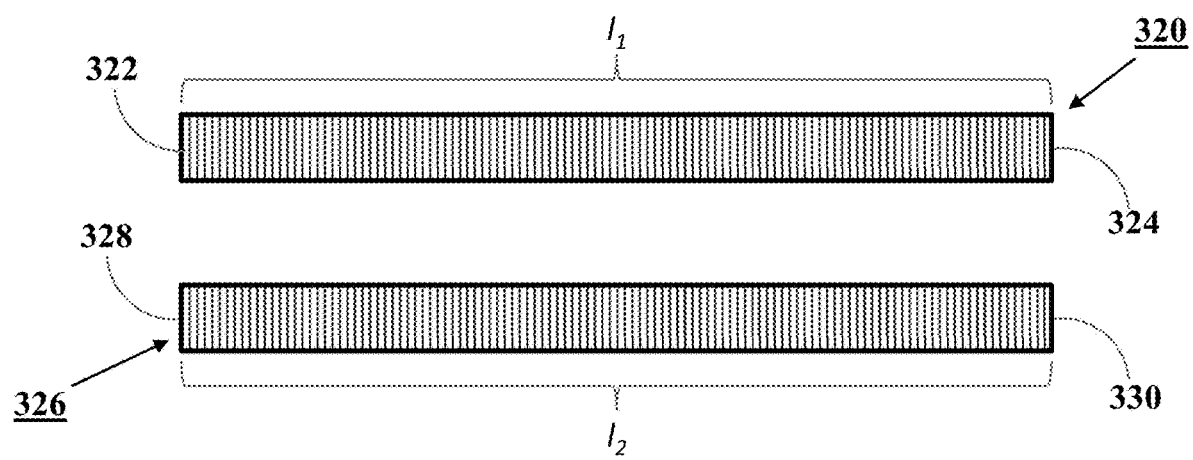
Figure 5A:
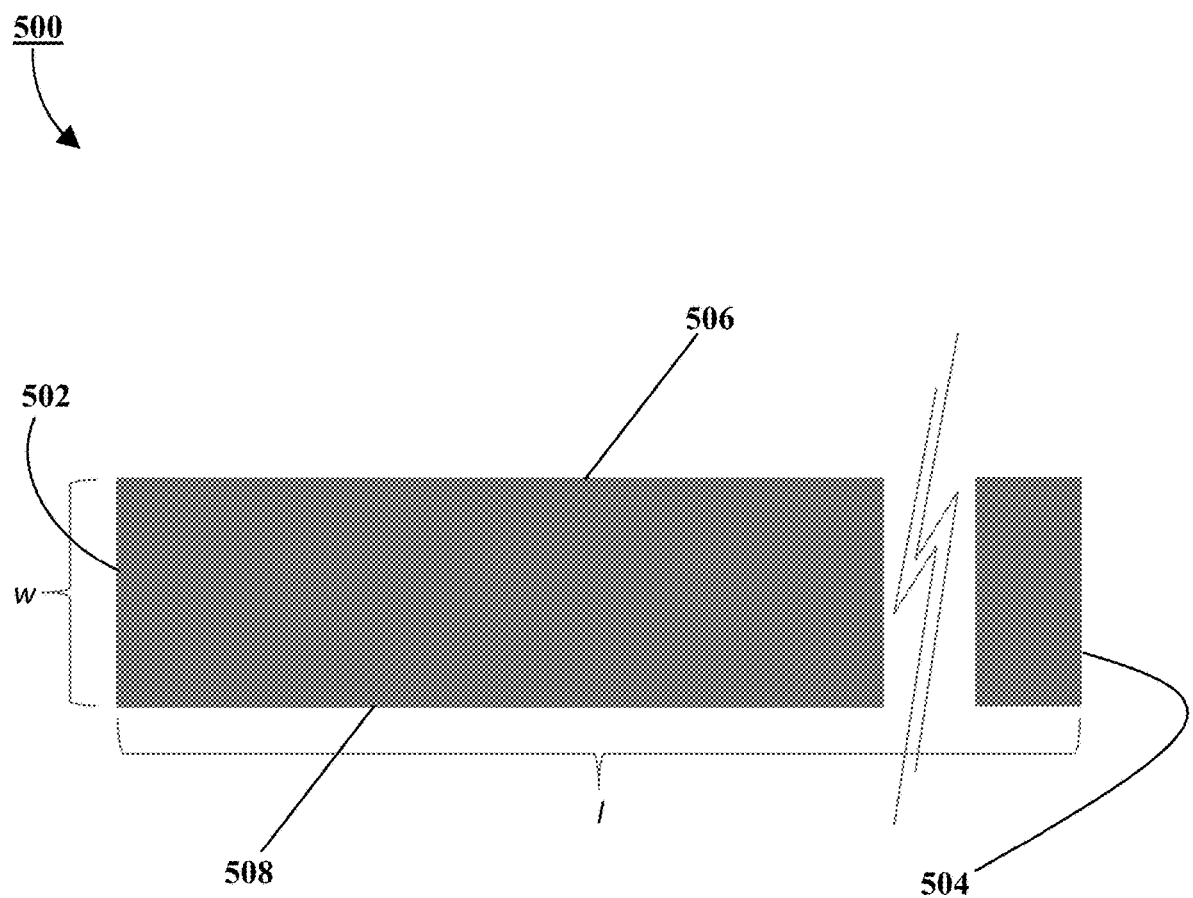
FIGS. 5A-5B are diagrams illustrating a multi-layer geomembrane, wherein the upper layer and the lower layer are dissimilar.
Figure 5B:
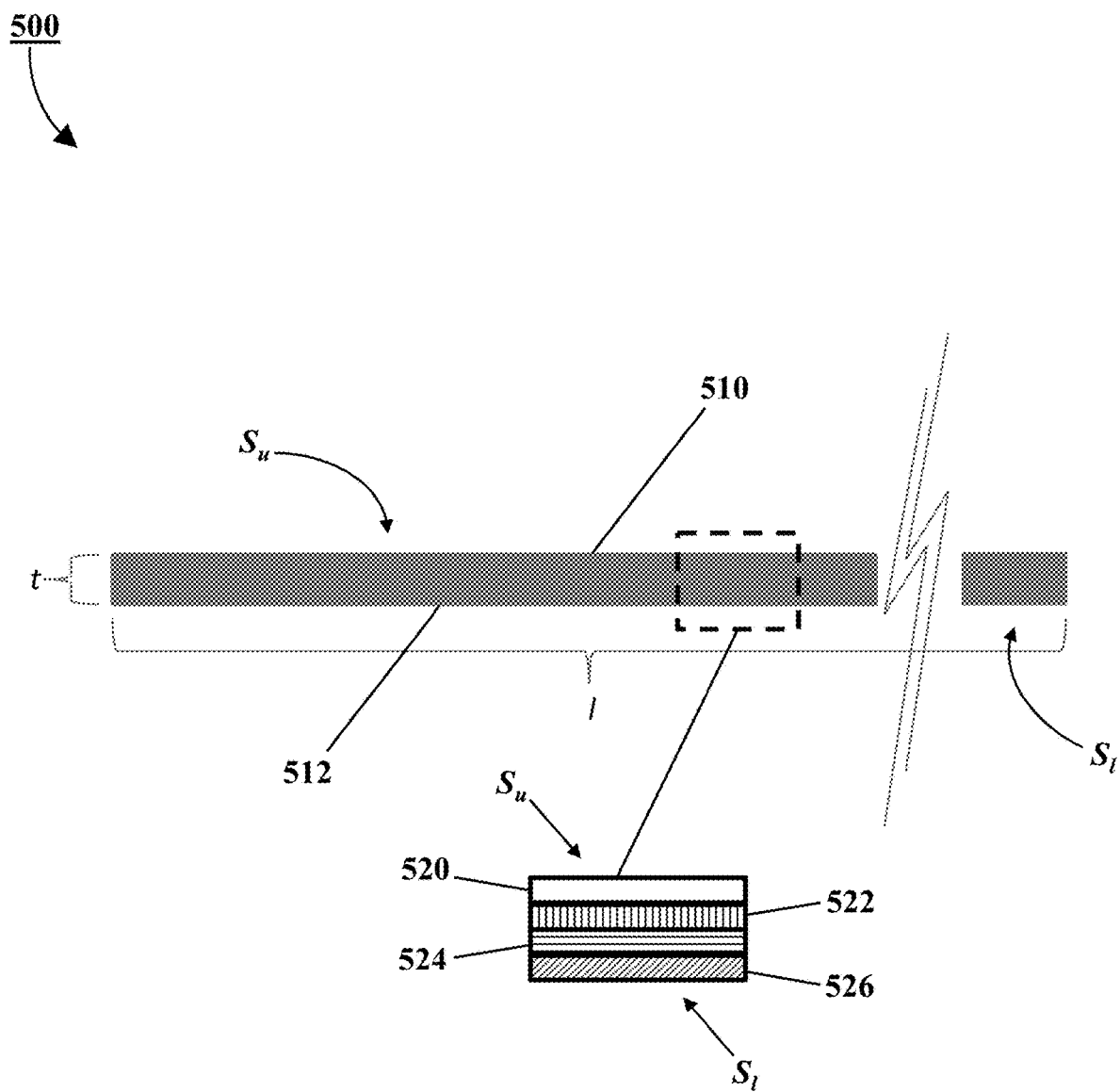

A geomembrane 500 is shown in FIGS. 5A-5B. The geomembrane 500 includes a first side 502, a second side 504, a third side 506, and a fourth side 508. The distance between the first side 502 and the second side 504 defines the length l of the geomembrane 500. The distance between the third side 506 and the fourth side 508 defines the width w of the geomembrane 500. Typically, during production the width w of the geomembrane 500 is constrained by processing and packaging concerns, while the length l of the geomembrane 500 can be as long as desired. Consequently, the width w is often considerably less than the length l. Often, the geomembrane 500, once produced, is stored on a roll.

The geomembrane 500 also includes a fifth side 510 and a sixth side 512. The fifth side 510 defines an upper surface $S_u$ and the sixth side 512 defines a lower surface $S_l$ of the geomembrane 500. The distance between the fifth side 510 and the sixth side 512 defines the thickness t of the geomembrane 500.

In some exemplary embodiments, the geomembrane 500 has a width w in the range of 140 inches to 150 inches. In some exemplary embodiments, the geomembrane 500 has a length l in the range of 1,000 feet to 1,800 feet. In some exemplary embodiments, the geomembrane 500 has a thickness t in the range of 0.02 inches to 0.05 inches.

The geomembrane 500 includes one or more polymeric layers. Typically, the geomembrane 500 includes at least two distinct polymeric layers. In this case, the layers are joined to one another (e.g., coated together, adhered together) to form the geomembrane. For example, the geomembrane 500 includes four distinct layers including a first layer 520, a second layer 522, a third layer 524, and a fourth layer 526. The first layer 520 defines the upper surface $S_u$ of the geomembrane 500. The fourth layer 526 defines the lower surface $S_l$ of the geomembrane 500.

In the geomembrane 500, the first layer 520 and the fourth layer 526 are different from one another (e.g., made from different materials or otherwise have significantly different melting temperatures). The second layer 522 and the third layer 524 may be the same or different. Additionally, each of the second layer 522 and the third layer 524 may be the same as or different from the first layer 520 and/or the fourth layer 526. It should be noted that the general inventive concepts are not limited to any particular geomembrane construction, as long as the two materials being heated for welding together are dissimilar. Thus, the geomembrane may have any number of layers.

Geomembranes are synthetic membrane liners or barriers used to control fluid migration in a manmade project, structure, or system. They are made from relatively thin continuous polymeric sheets that are sometimes made from the infusion of geotextiles with asphalt, elastomer, or polymer sprays.

Geomembranes often have a range of chemical resistance and physical properties that make them suitable for a diverse range of applications including, but not limited to, use as liners in oil fields, landfills, water containments, wastewater remediations, and the agriculture industry.

However, because the width w of the geomembrane 500 is rarely wide enough for a particular application, a first instance 530 of the geomembrane 500 is positioned next to a second instance 540 of the geomembrane 500, such that a portion of the geomembranes 530, 540 overlap with one another to form an overlapped region 550. The first geomembrane 530 has a first width $w_1$ and the second geomembrane 540 has a second width $w_2$, wherein $w_1$ typically equals $w_2$. The overlapped region 550 has a third width $w_3$ and defines an area where the geomembranes 530, 540 are joined together, such as by thermal bonding (i.e., welding). In some exemplary embodiments, the width $w_3$ of the overlapped region 550 (i.e., the eventual weld seam) is in the range of 3 inches to 5 inches. The joined geomembranes 530, 540 form a geomembrane 600 having a fourth width $w_4$ (i.e., $(w_1+w_2)-w_3$). The process can be repeated with additional lengths of geomembrane to achieve a desired overall width. Thus, the overall dimensions of the geomembrane 600 are customizable. In some instances, the geomembrane 600 can be made to cover a relatively large area in the range of 100,000 square feet to 200,000 square feet.

Figure 6:
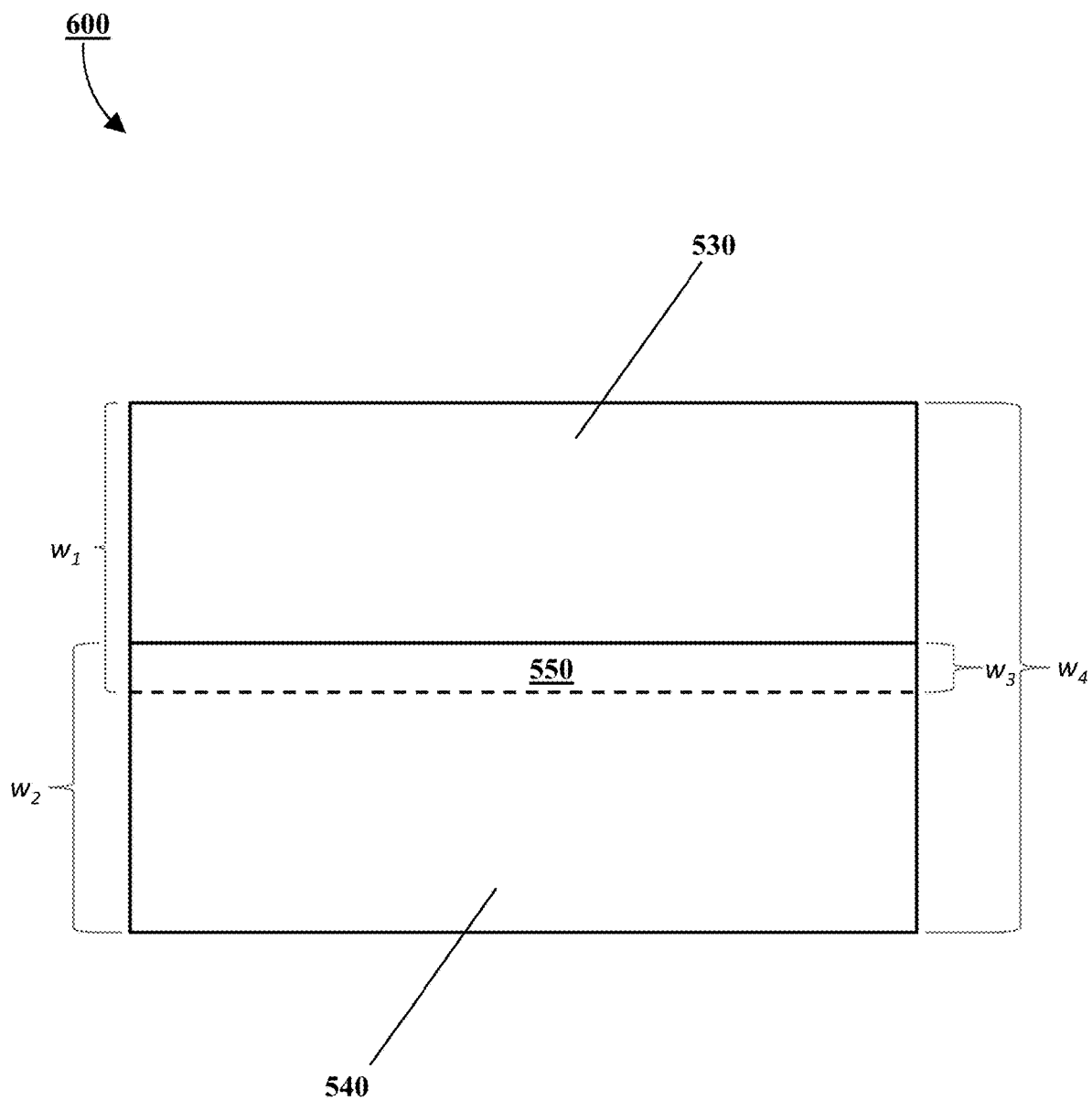
FIG. 6 is a diagram illustrating two pieces of the geomembrane of FIGS. 5A-5B positioned relative to one another in advance of welding the pieces together.
Figure 7A:
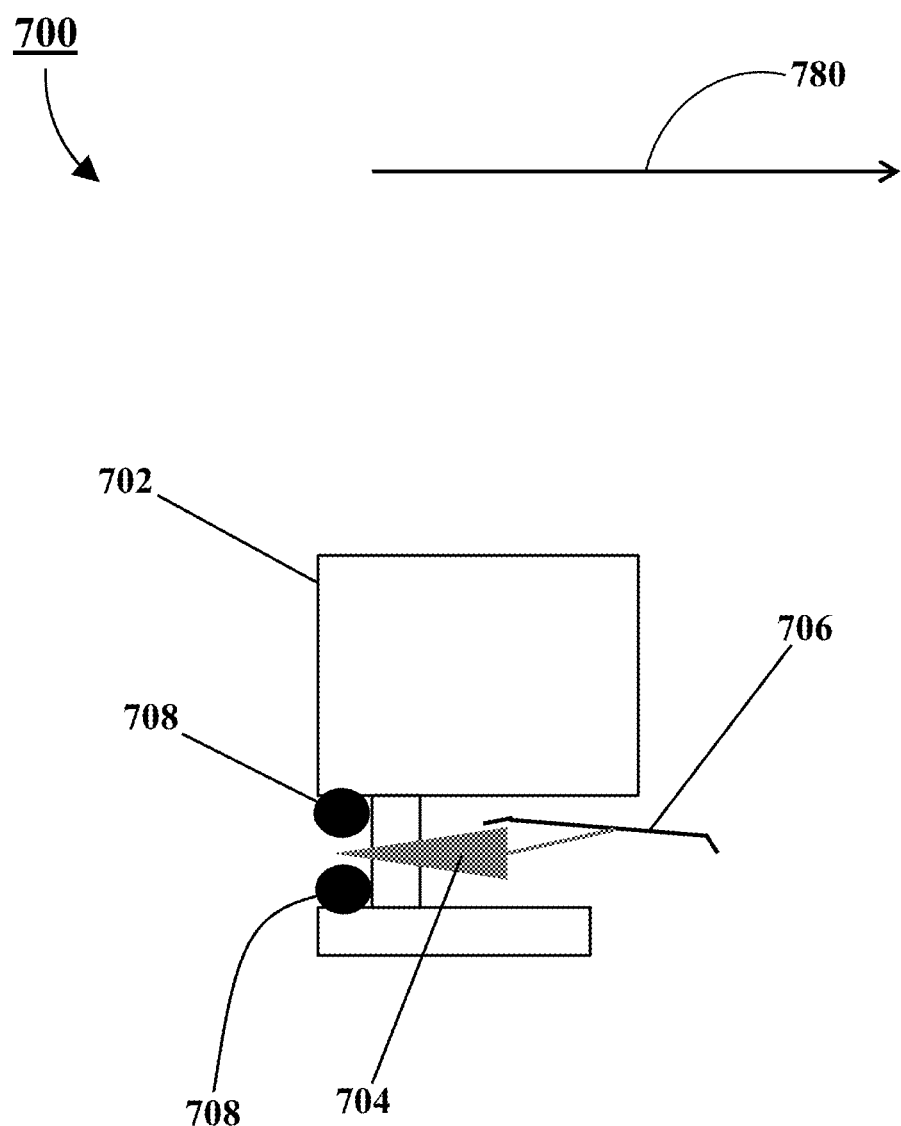
FIGS. 7A-7C are diagrams illustrating (a side view of) a welding device, according to one exemplary embodiment, for welding the geomembrane pieces of FIG. 6 together.
Figure 7B:
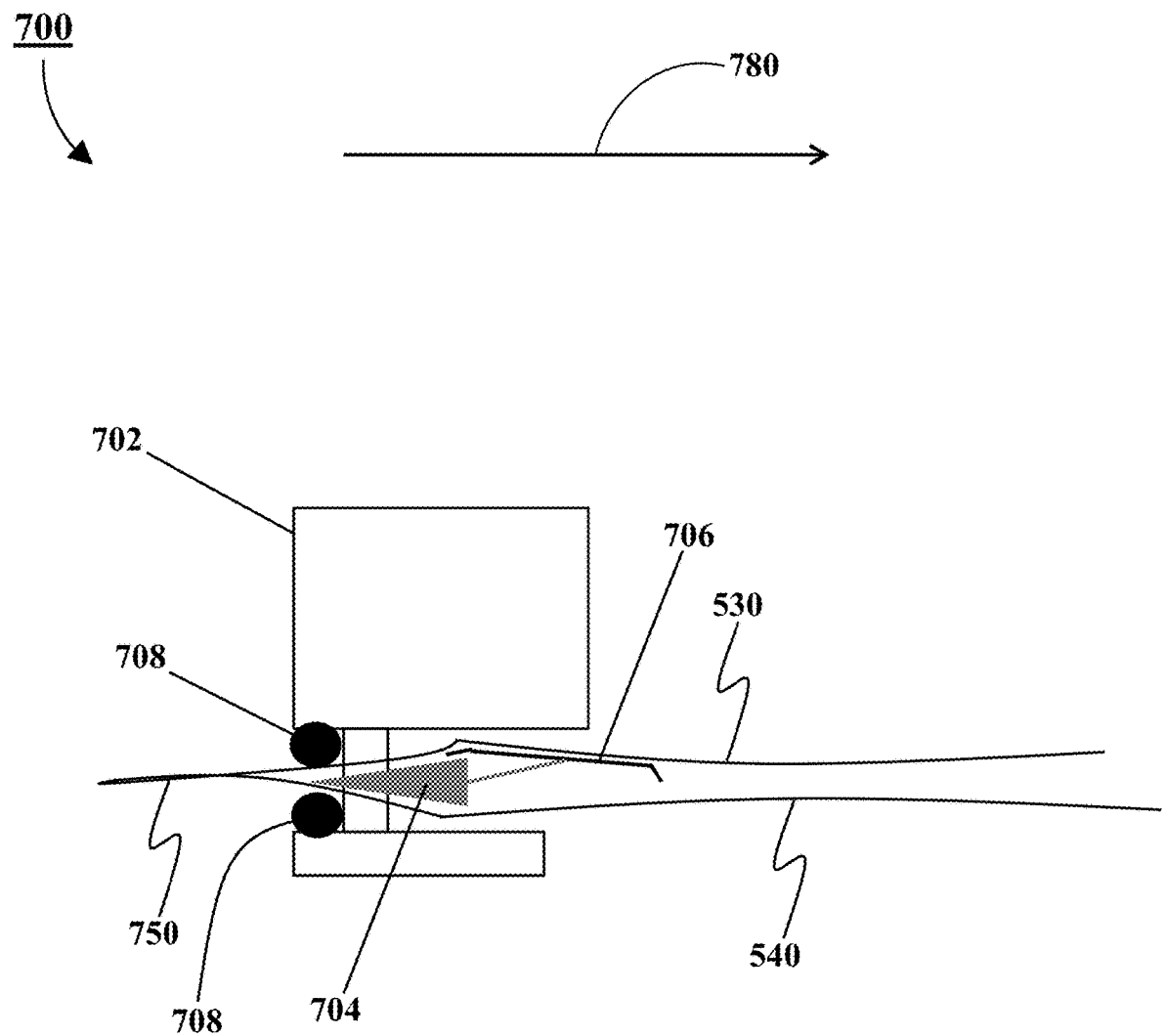
Figure 7C:
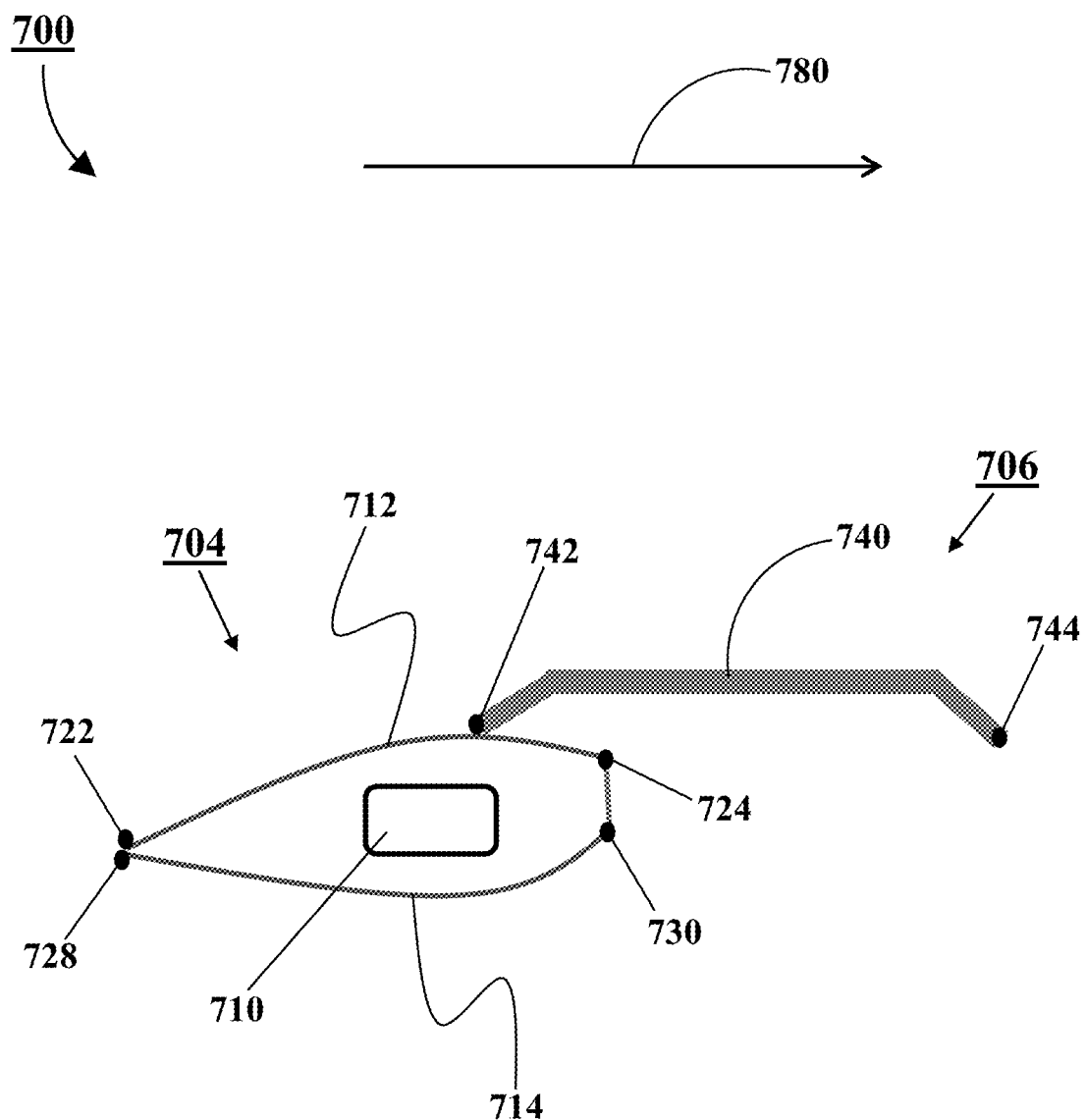

FIGS. 7A-7C illustrate an improved wedge welder 700, according to one exemplary embodiment, for welding two overlapped sheets of geomembrane material, such as the geomembranes 530, 540 shown in FIG. 6. The wedge welder 700 is typically a hand-held device that is positioned to traverse an overlapped region (e.g., the overlapped region 550) in a direction indicated by arrow 780. In other words, the welder 700 moves in the direction 780, while the geomembranes 530, 540 retain their position. In some exemplary embodiments, the welder 700 can achieve a maximum welding speed in the range of 8 ft./min (fpm) to 32 ft./min. (fpm), depending on the material being welded.

The wedge welder 700 includes a body 702, a wedge 704, a guide plate 706, and a pressure mechanism (here, a pair of rollers 708). The body 702 holds the other components together and can include additional structure, such as a handle (not shown). In some exemplary embodiments, the welder 700 has a compact design and relatively light weight that renders it particularly suited for joining sheets of geomembrane material together in the field. The guide plate 706 typically supports high speed in-house fabrication.

The wedge 704 includes a heating element 710, as shown in FIG. 7C, that relatively evenly heats an upper surface 712 of the wedge 704 and a lower surface 714 of the wedge 704. The heating element 710 can be a single heating element or multiple heating elements disposed along a length of the wedge 704. In this manner, the upper surface 712 of the wedge 704 defines a first heating path 720 between points 722 and 724, while the lower surface 714 of the wedge 704 defines a second heating path 726 between points 728 and 730. In some exemplary embodiments, the heating element 710 can achieve temperatures in the range of 315° C. to 460° C. In some exemplary embodiments, the geomembrane materials are thermally bonded together at temperatures in the range of 350° C. to 400° C.

The guide plate 706 includes a body 740 that extends between a first end 742 and a second end 744. In some exemplary embodiments, the body 704 is made of metal. In some exemplary embodiments, the body 704 is made of stainless steel. As it is the positioning of the guide plate 706 relative to the wedge 704 that is important, the guide plate 706 can have any suitable dimensions (width, length, thickness). Of note, the guide plate 706 is positioned to overlap or otherwise cover a portion of the upper surface 712 of the wedge 704.

In some exemplary embodiments, a width of the guide plate 706 is in the range of 3.0 inches to 3.5 inches. In some exemplary embodiments, a length of the guide plate 706 is in the range of 5.0 inches to 6.0 inches. In some exemplary embodiments, a length of the guide plate 706 is in the range of 6.5 inches to 7.5 inches. In some exemplary embodiments, a thickness of the guide plate 706 is in the range of 0.5 inches to 0.7 inches.

As shown in FIG. 7B, the guide plate 706 guides the overlapped sheets so that an upper sheet of the geomembrane material (i.e., the geomembrane 530) is conveyed to the upper surface 712 of the wedge 704 and a lower sheet of the geomembrane material (i.e., the geomembrane 540) is conveyed to the lower surface 714 of the wedge. After the geomembrane 530 traverses the first heating path 720 and the geomembrane 540 traverses the second heating path 726, the rollers 708 immediately press the heated materials together to form a weld 750 (i.e., a seam of the geomembrane 600).

Figure 8:
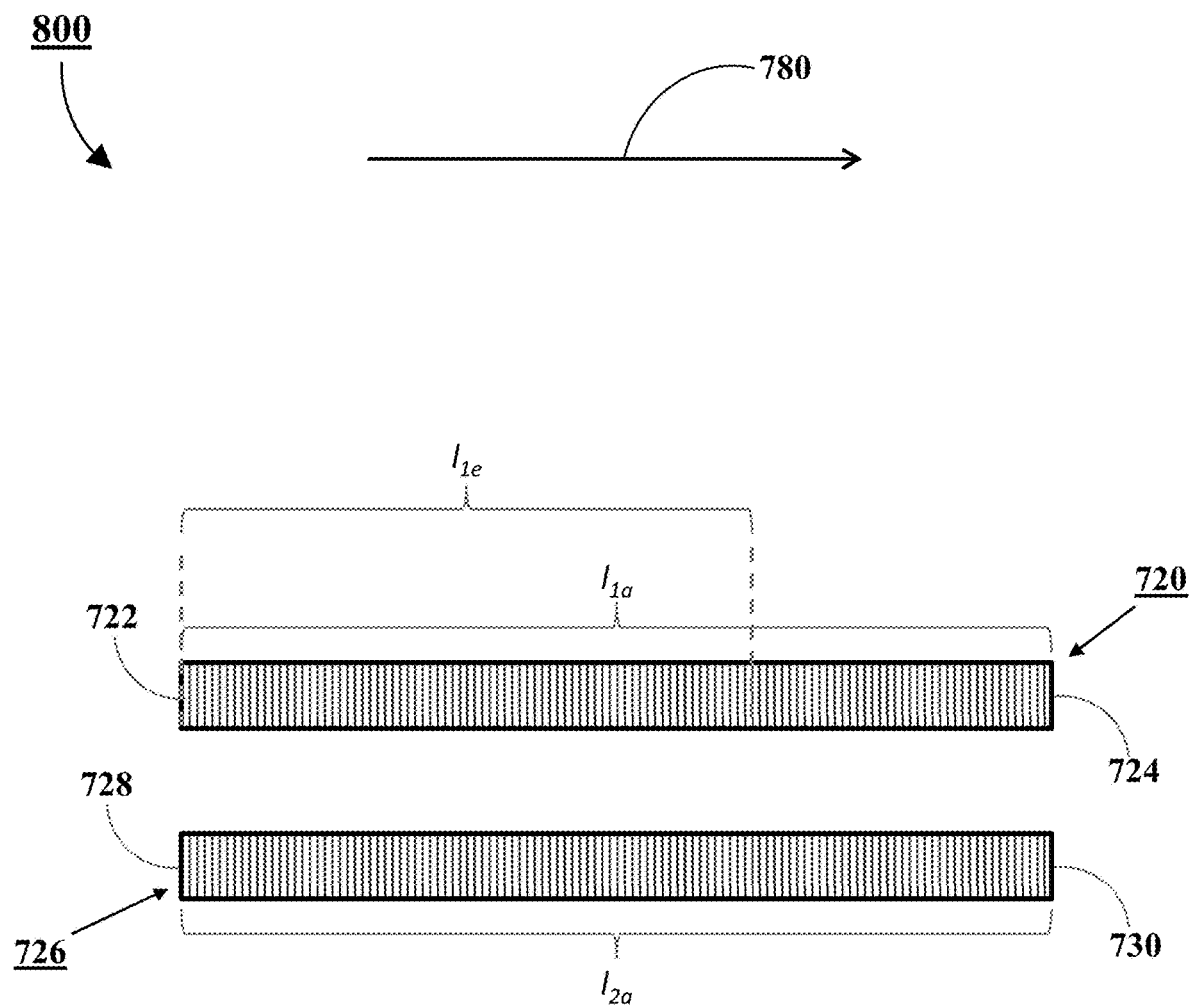
FIG. 8 is a diagram illustrating the heating paths that each of the geomembrane pieces of FIG. 6 travels during the welding process.

For purposes of illustration, the first heating path 720 and the second heating path 726 are represented as linear distances in the diagram 800 of FIG. 8. The first heating path 720 has an actual length $l_{1a}$ and the second heating path 726 has an actual length $l_{2a}$. Since the length $l_{1a}$ is equal to the length $l_{2a}$ and since the temperature applied along the first heating path 720 is substantially equal to the temperature applied along the second heating path 726, the lower surface $S_l$ of the geomembrane 530 and the upper surface $S_u$ of the geomembrane 540 forming the seam 750 would normally receive substantially the same amount of heat applied by the wedge 704.

However, since the lower surface $S_l$ of the geomembrane 530 and the upper surface $S_u$ of the geomembrane 540 are formed from different materials, this even heating of the surfaces $S_l$, $S_u$ results in a seam that would have decreased properties (e.g., peel strength, shear strength). Thus, in the case of the welder 700, the guide plate 706 is positioned to overlap or otherwise cover a portion of the upper surface 712 of the wedge 704, as noted above.

More specifically, as shown in FIG. 7C, the first end 742 of the body 740 of the guide plate 706 is positioned between the points 722 and 724 of the upper surface 712 of the wedge 704. In this manner, a portion (e.g., >10%) of the upper surface 712 of the wedge 704 is prevented from contacting the lower surface $S_l$ of the geomembrane 530, which results in a different heating profile being applied to the lower surface $S_l$ of the geomembrane 530 than to the upper surface $S_u$ of the geomembrane 540, by the wedge 704.

In other words, positioning of the guide plate 706 on the upper surface 712 of the wedge 704 results in the first heating path 720 having a reduced length (i.e., an effective length lie) as compared to the actual length $l_{1a}$. The difference between the actual length $l_{1a}$ and the effective length $l_{1e}$ is equal to the distance between the first end 742 of the body 740 of the guide plate 706 and the point 724 on the wedge 704.

Consequently, as shown in FIG. 8, the first heating path 720 has a length $l_{1e}$ that is significantly (i.e., >5%) smaller than the length $l_{2a}$ of the second heating path 726. As a result, the lower surface $S_l$ of the geomembrane 530 and the upper surface $S_u$ of the geomembrane 540 forming the seam 750 do not receive the same amount of heat applied by the wedge 704, such that the resulting weld (i.e., the seam 750) can exhibit improved properties (e.g., peel strength, shear strength).

In some exemplary embodiments, the position of the guide plate 706 on the upper surface 712 of the wedge 704 is fixed. This may be advantageous, for example, when the welder 700 will be processing the same type of geomembrane material over and over again.

In some exemplary embodiments, the position of the guide plate 706 on the upper surface 712 of the wedge 704 is variable or otherwise adjustable. This may be advantageous, for example, when the welder 700 will be processing many different types of geomembrane materials, at least some of which have dissimilar upper and lower surfaces.

In some exemplary embodiments, the position of the guide plate 706 on the upper surface 712 of the wedge 704 can be adjusted so that the effective length $l_{1e}$ of the first heating path 720 is in the range of 5% to 95% of the actual length $l_{1a}$. In some exemplary embodiments, the position of the guide plate 706 on the upper surface 712 of the wedge 704 can be adjusted so that the effective length lie of the first heating path 720 is in the range of 15% to 85% of the actual length $l_{1a}$. In some exemplary embodiments, the position of the guide plate 706 on the upper surface 712 of the wedge 704 can be adjusted so that the effective length lie of the first heating path 720 is in the range of 25% to 75% of the actual length $l_{1a}$. In some exemplary embodiments, the position of the guide plate 706 on the upper surface 712 of the wedge 704 can be adjusted so that the effective length $l_{1e}$ of the first heating path 720 is in the range of 35% to 65% of the actual length $l_{1a}$. In some exemplary embodiments, the position of the guide plate 706 on the upper surface 712 of the wedge 704 can be adjusted so that the effective length $l_{1e}$ of the first heating path 720 is in the range of 45% to 55% of the actual length $l_{1a}$.

While the illustrated embodiments disclose covering at least a portion of the upper surface 712 of the wedge 704 of the welder 700 with the guide plate 706 to alter the first heating path 720, it should be appreciated that the general inventive concepts also encompass (alternatively or additionally) covering at least a portion of the lower surface 714 of the wedge 704 of the welder 700 with the guide plate 706 to alter the second heating path 726.

As noted above, the ability of the welder 700 to vary the heating profile presented by the first heating path 720 relative to the second heating path 726 allows the welder 700 to produce welds (e.g., the seam 750) with improved properties (e.g., peel strength, shear strength).

To illustrate such improvements, a welder was used to weld discrete pieces of a geomembrane material together. Here, the welder was a Pro-Wedge Model VM-20 wedge welder sold by DemTech Services of Diamond Springs, Calif.; and the geomembrane material was the RhinoMat® 750 reinforced composite geomembrane product sold by Owens Corning of Toledo, Ohio.

The RhinoMat® 750 geomembrane product is a 30 mil (0.76 mm) thick, polyethylene reinforced composite geomembrane (RCG) specifically designed for use in water retention and containment applications. The RhinoMat® 750 geomembrane product has four distinct layers (from the top to the bottom): (1) an upper SurFlex™ UV resistant film (140 g/m$^2$); (2) an LLDPE/LDPE coating (80 g/m$^2$); an HDPE scrim (267.7 g/m$^2$); and a lower LLDPE/LDPE coating (100 g/m$^2$). Because the upper layer and the lower layer materials are different, the conventional welder 300 is unable to achieve a higher quality weld.

Figure 9:
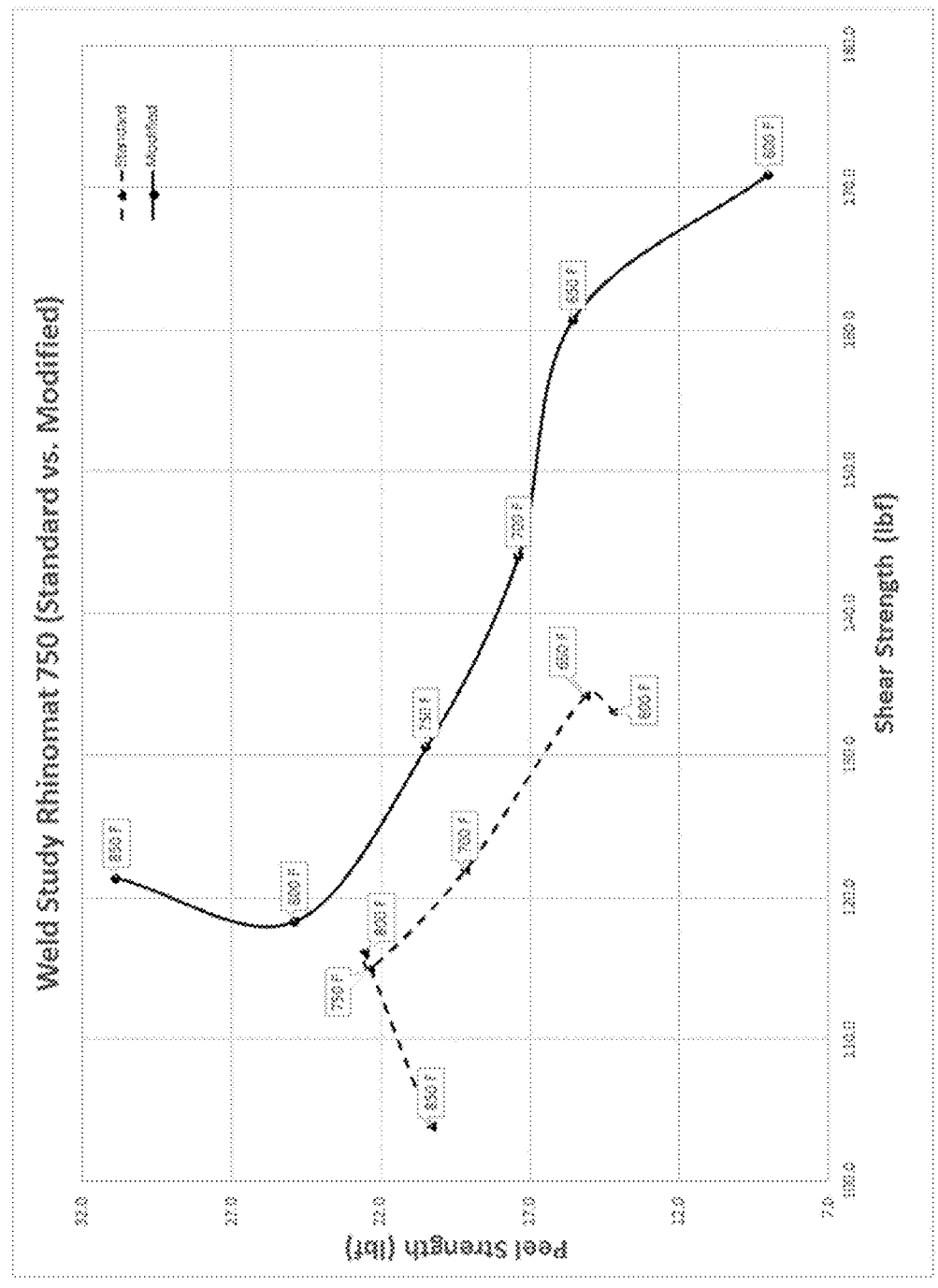
FIG. 9 is a graph showing comparative data from welding geomembrane materials having dissimilar surfaces together with a conventional welder and a modified welder.

To show this phenomenon, the Pro-Wedge Model VM-20 wedge welder was used in its commercially-available form (similar to the welder 300) to generate standard data and in a form modified according to the general inventive concepts (similar to the welder 700) to generate modified data. The standard data and the modified data are plotted in the graph 900 of FIG. 9. The welds produced on the RhinoMat® 750 geomembrane product using the modified welder exhibited superior performance versus the welds produced on the RhinoMat® 750 geomembrane product using the conventional (i.e., unmodified) welder. For example, the welds produced on the RhinoMat® 750 geomembrane product using the modified welder had up to 37% increased peel strength (lbs./ft.). As another example, the welds produced on the RhinoMat® 750 geomembrane product using the modified welder had up to 27% increased shear strength (lbs./ft.).

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices and systems disclosed. For example, while the exemplary embodiments described and shown herein relate to a geomembrane material, the general inventive concepts may encompass other polymeric materials that are welded together (e.g., geotextiles). As another example, while the exemplary embodiments described and shown herein use existing structure of the welder (e.g., a guide plate) to overlap or otherwise cover a portion of a surface of the heated wedge, the general inventive concepts encompass the use of other structure (including structure not native to the welder) for such purpose. It is sought, therefore, to cover all such changes and modifications as fall within the spirit and scope of the general inventive concepts, as described and/or claimed herein, and any equivalents thereof.

The invention claimed is:

1. A method of joining a first polymeric sheet and a second polymeric sheet together by thermal bonding, the method comprising:
providing a welder comprising:
a heating element having a first face defining a first heating length and a second face defining a second heating length, the first heating length equal to the second heating length; and
a guide plate, wherein a portion of the guide plate covers a portion of the first face to reduce the first heating length to less than the second heating length;
using the guide plate to convey the first polymeric sheet to the first face of the heating element so that the first polymeric sheet travels less than the first heating length; and
using the guide plate to convey the second polymeric sheet to the second face of the heating element so that the second polymeric sheet travels the second heating length.

2. The method of claim 1, wherein the first polymeric sheet has a lower surface formed of a first material,
wherein the second polymeric sheet has an upper surface formed of a second material, and
wherein the first material and the second material are different.

3. The method of claim 1, wherein the first polymeric sheet and the second polymeric sheet have the same construction.

4. The method of claim 1, wherein the first polymeric sheet comprises a plurality of layers, and
wherein the second polymeric sheet comprises a plurality of layers.

5. The method of claim 4, wherein the first polymeric sheet comprises four layers, and
wherein the second polymeric sheet comprises four layers.

6. The method of claim 1, further comprising powering the heating element to a temperature in the range of 350° C. to 400° C.

7. The method of claim 1, further comprising fusing the first polymeric sheet and the second polymeric sheet together.

8. The method of claim 1, wherein the first polymeric sheet and the second polymeric sheet are geomembranes.

9. The method of claim 1, wherein the heating element is a wedge-shaped member, such that a distance between the first face of the heating element and the second face of the heating element varies over a length of the heating element.

10. The method of claim 1, wherein a width of the guide plate is in the range of 3.0 inches to 3.5 inches.

11. The method of claim 1, wherein a length of the guide plate is in the range of 5.0 inches to 7.5 inches.

12. The method of claim 1, wherein a thickness of the guide plate is in the range of 0.5 inches to 0.7 inches.

13. The method of claim 1, wherein the guide plate is fixed relative to the heating element.

14. The method of claim 1, wherein the guide plate is adjustable relative to the heating element.

15. The method of claim 1, wherein the portion of the guide plate covers between 5% to 95% of the first face of the heating element.

16. The method of claim 1, wherein the portion of the guide plate covers between 45% to 55% of the first face of the heating element.

17. The method of claim 1, wherein the guide plate does not cover a portion of the second face.

* * * * *